(12) United States Patent
Wu et al.

(10) Patent No.: US 9,250,398 B2
(45) Date of Patent: Feb. 2, 2016

(54) OPTICAL FIBER CONNECTOR

(71) Applicant: Advanced-Connectek Inc., New Taipei (TW)

(72) Inventors: Jun Wu, Tian-Jin (CN); Yang-Yang Cui, Tian-Jin (CN); Hai-Jiang Deng, Tian-Jin (CN)

(73) Assignee: Advanced-Connectek Inc., New Taipei (TW)

( * ) Notice: Subject to any disclaimer, the term of this patent is extended or adjusted under 35 U.S.C. 154(b) by 0 days.

(21) Appl. No.: 14/464,746

(22) Filed: Aug. 21, 2014

(65) Prior Publication Data

US 2015/0093081 A1    Apr. 2, 2015

(30) Foreign Application Priority Data

Sep. 27, 2013    (CN) .............................. 201310445899

(51) Int. Cl.
*G02B 6/44* (2006.01)
*G02B 6/38* (2006.01)

(52) U.S. Cl.
CPC .................................... *G02B 6/3874* (2013.01)

(58) Field of Classification Search
USPC ........................................................... 385/84
See application file for complete search history.

(56) References Cited

U.S. PATENT DOCUMENTS

| 7,331,719 | B2 * | 2/2008 | Manning et al. ................. 385/81 |
| 8,821,032 | B2 * | 9/2014 | Su et al. ........................... 385/62 |
| 2011/0044588 | A1 * | 2/2011 | Larson et al. .................... 385/81 |
| 2012/0027360 | A1 * | 2/2012 | Larson et al. .................... 385/78 |

FOREIGN PATENT DOCUMENTS

| CN | 201352267 Y |   | 11/2009 |
| CN | 102385121 A | * | 11/2011 |
| CN | 102854578 A |   | 1/2013 |

* cited by examiner

*Primary Examiner* — Eric Wong
(74) *Attorney, Agent, or Firm* — Alan D. Kamrath; Kamrath IP Lawfirm, P.A.

(57) ABSTRACT

An optical fiber connector includes a ferrule, a fastening tube, and a cover plate. The ferrule includes a through hole and a breach. Front and rear parts of the through hole respectively include a pre-embedded optical fiber and a field optical fiber. A joint of the two optical fibers is located at the breach. A part of the through hole is exposed in the breach. The fastening tube includes a ferrule accommodating portion accommodating a part of the ferrule on which the breach is disposed, and an opening disposed thereon. The opening connects the ferrule accommodating portion, and is positionally corresponding to the breach. The cover plate passes through the opening, is disposed in the breach, and presses the joint. The ferrule is easily machined and can adopt a material hardly influenced by environment temperature. The joint is fixed, and an amount of joint loss is stable.

9 Claims, 9 Drawing Sheets

OPTICAL FIBER CONNECTOR

BACKGROUND OF THE INVENTION

1. Field of the Invention

The present invention relates to an optical fiber connector and, more particularly, to an optical fiber connector utilized for quickly joining optical fibers in the field, which is also known as an optical fiber quick connector or field installable/mountable optical fiber connector.

2. Description of the Prior Art

Referring to FIG. 8, a Chinese patent application whose application number is 200920036423.3 discloses a traditional optical fiber quick connector which adopts a V-shape trough served as a positioning structure for joining optical fibers. The optical fiber quick connector includes a press block 12 and a press cover 13. The press block 12 includes a bump 12-1 disposed on an upper side thereof. The press cover 13 includes a V-shape trough 13-1 along an axis thereof. In order to join two optical fibers, the first step is positioning the two optical fibers requiring to be joined in the V-shape trough 13-1 of the press cover 13, the second step is positioning the press block 12 on the press cover 13, and, then, the third step is making a sleeve (not shown in the figure) enclose the press block 12 and the press cover 13. The sleeve presses the bump 12-1 of the press block 12 to tightly press and fasten the two joined optical fibers in the V-shape trough 13-1. However, the V-shape trough 13-1 that the optical fiber quick connector adopts requires a high degree of machining accuracy. If the press cover 13 is ceramic, it is difficult to have the V-shape trough 13-1 properly machined. If the press cover 13 is of plastic or of metal, the V-shape trough 13-1 is easily influenced by environment temperature and has poor stability.

Referring to FIG. 9, a Chinese patent application whose application number is 201210259726.8 discloses another traditional optical fiber quick connector which adopts a ferrule served as a positioning structure for joining optical fibers. The ferrule is usually ceramic. Therefore, the ferrule is hardly influenced by environment temperature and has high stability. The optical fiber quick connector includes a ferrule 14. The ferrule 14 includes a through hole 14-1. A pre-embedded optical fiber 15 is pre-embedded in a front part of the through hole 14-1. A field optical fiber 16 is inserted into a rear part of the through hole 14-1 in the field. The pre-embedded optical fiber 15 and the field optical fiber 16 are joined at a predetermined joint position in the through hole 14-1 of the ferrule 14. The ferrule 14 further includes an exhaust passage 14-2 which is disposed on a wall thereof and is corresponding to the predetermined joint position. A part of the through hole 14-1 of the ferrule 14 is exposed in the exhaust passage 14-2, so that compressed air from the through hole 14-1 when the pre-embedded optical fiber 15 and the field optical fiber 16 are joined can be exhausted through the exhaust passage 14-2. In addition, matching liquid can be added through the exhaust passage 14-2 before joining the optical fibers. After the pre-embedded optical fiber 15 and the field optical fiber 16 are joined, however, a joint of the two joined optical fibers is not fixed due to the existence of the exhaust passage 14-2, and, as a result, an amount of joint loss is unstable.

SUMMARY OF THE INVENTION

According to the disadvantage of the prior art, the present invention aims to provide an optical fiber connector whose positioning structure is easily machined. The positioning structure can adopt a material hardly influenced by environment temperature, such as a ceramic material, and as a result, the positioning structure has high stability. After two optical fibers are joined, a joint of the two optical fibers is fixed, and, as a result, an amount of joint loss is stable.

According to the invention, the optical fiber connector comprises a ferrule, a fastening tube, and a cover plate. The ferrule comprises a through hole and a breach. The breach is disposed on a wall of the ferrule. A pre-embedded optical fiber is pre-embedded in a front part of the through hole of the ferrule. A field optical fiber is inserted into a rear part of the through hole of the ferrule. A joint of the pre-embedded optical fiber and the field optical fiber is located at the breach. A part of the through hole of the ferrule is exposed in the breach. The fastening tube comprises a ferrule accommodating portion and an opening. The ferrule accommodating portion accommodates a part of the ferrule on which the breach is disposed. The opening of the fastening tube is disposed on a wall of the fastening tube, connects the ferrule accommodating portion, and is positionally corresponding to the breach. The cover plate passes through the opening, is disposed in the breach, and presses the joint of the pre-embedded optical fiber and the field optical fiber.

According to an embodiment of the invention, the optical fiber connector further comprises a compression sleeve, and the cover plate comprises a bump disposed on an upper side thereof. The compression sleeve encloses a part of the fastening tube on which the opening is disposed. An inner wall of the compression sleeve presses the bump of the cover plate to make a lower side of the cover plate tightly press the joint of the pre-embedded optical fiber and the field optical fiber.

According to another embodiment of the invention, the optical fiber connector further comprises a clamp tube. The clamp tube comprises a through hole for being passed through by the field optical fiber. The clamp tube further comprises a front segment, a middle segment, a rear segment, and two bumps respectively disposed on two sides of the middle segment. The fastening tube further comprises a tube accommodating portion and a through hole. The tube accommodating portion accommodates the front segment. The through hole is located between the ferrule accommodating portion and the tube accommodating portion and is for being passed through by the field optical fiber. The inner wall of the compression sleeve presses the bumps of the middle segment to shrink an inner diameter of the through hole of the middle segment to tightly clamp the field optical fiber passing through the through hole of the clamp tube.

According to another embodiment of the invention, the middle segment comprises a trough disposed on a wall thereof and connecting the through hole of the clamp tube. The inner wall of the compression sleeve presses the bumps of the middle segment to shrink the trough of the middle segment to shrink the inner diameter of the through hole of the middle segment and tightly clamp the field optical fiber passing through the through hole of the clamp tube.

According to another embodiment of the invention, the optical fiber connector further comprises a front sleeve, a rear tube, and a spring. The clamp tube further comprises a flange disposed on a wall thereof and located between the middle segment and the rear segment. The spring encloses a front part of the rear segment and abuts the flange. The front sleeve comprises a coupling component and an accommodating through hole for accommodating a rear part of the ferrule, the fastening tube, the cover plate, the compression sleeve, the front segment, the middle segment, the front part of the rear segment, and the spring. A front end of the rear tube abuts the spring. The rear tube comprises a coupling component and an accommodating through hole for accommodating a rear part of the rear segment and the field optical fiber. The coupling component of the rear tube and the coupling component of the front sleeve are coupled with each other.

According to another embodiment of the invention, the rear tube further comprises a plurality of ribs disposed on an inner wall thereof. The ribs tightly clamp the field optical fiber passing through the accommodating through hole of the rear tube.

According to another embodiment of the invention, the optical fiber connector further comprises a lock cap. The lock cap comprises an accommodating through hole and an inner thread disposed on an inner wall of the lock cap. The rear tube further comprises an outer thread disposed on an outer wall thereof. The lock cap encloses the rear tube by mating the inner thread with the outer thread. The inner wall of the lock cap presses the rear tube to shrink an inner diameter of the accommodating through hole of the rear tube to tightly clamp the field optical fiber passing through the accommodating through hole of the rear tube.

According to another embodiment of the invention, the rear tube further comprises a trough disposed on a wall thereof. The trough connects the accommodating through hole of the rear tube. The inner wall of the lock cap presses the rear tube to shrink the trough of the rear tube to shrink the inner diameter of the accommodating through hole of the rear tube and tightly clamp the field optical fiber passing through the accommodating through hole of the rear tube.

According to another embodiment of the invention, the optical fiber connector further comprises a housing. The housing comprises an opening disposed on a front end thereof. The housing encloses the front sleeve. A front part of the ferrule extends outside the opening of the housing.

According to another embodiment of the invention, the optical fiber connector further comprises a dust-proof cap. The dust-proof cap encloses a front part of the ferrule.

Any one of the manners of the embodiments set forth can be applied to the other one thereof to become a new embodiment as long as the manners do not contradict. According to the manners set forth, a ferrule serves as a positioning structure for joining optical fibers. The ferrule comprises a breach disposed on a wall thereof, and a joint of a pre-embedded optical fiber and a field optical fiber is located at the breach. A part of the through hole of the ferrule is exposed in the breach. The breach is utilized for exhausting compressed air from the through hole of the ferrule when the pre-embedded optical fiber and the field optical fiber are joined, or for adding matching liquid to the through hole of the ferrule. Comparing to the prior V-shape trough, the structure of the ferrule of the present invention is easily machined. Therefore, the ferrule can adopt a material which is hardly influenced by environment temperature, such as ceramic material, and, as a result, the ferrule has high stability. After two optical fibers are joined in the through hole of the ferrule, a fastening tube encloses the ferrule, and a cover plate passes through an opening of the fastening tube, is disposed in the breach, and presses the joint of the pre-embedded optical fiber and the field optical fiber. The joint of the two optical fibers is fixed, and, as a result, an amount of joint loss is stable.

DETAILED DESCRIPTION

Figure 1:
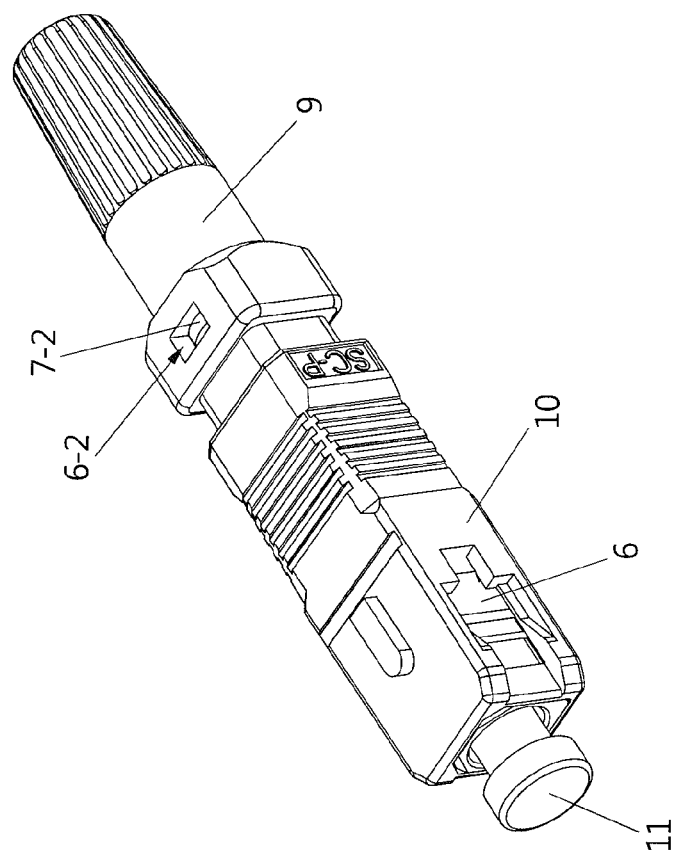
FIG. 1 is a diagram of an optical fiber connector according to a preferred embodiment of the present invention.

In embodiments below, the same or similar reference characters represent the same or similar components. In addition, directional terms described in the embodiments are merely used for reference and illustration according to the drawings. Therefore, the directional terms shall not limit the scope of the invention.

Figure 2:
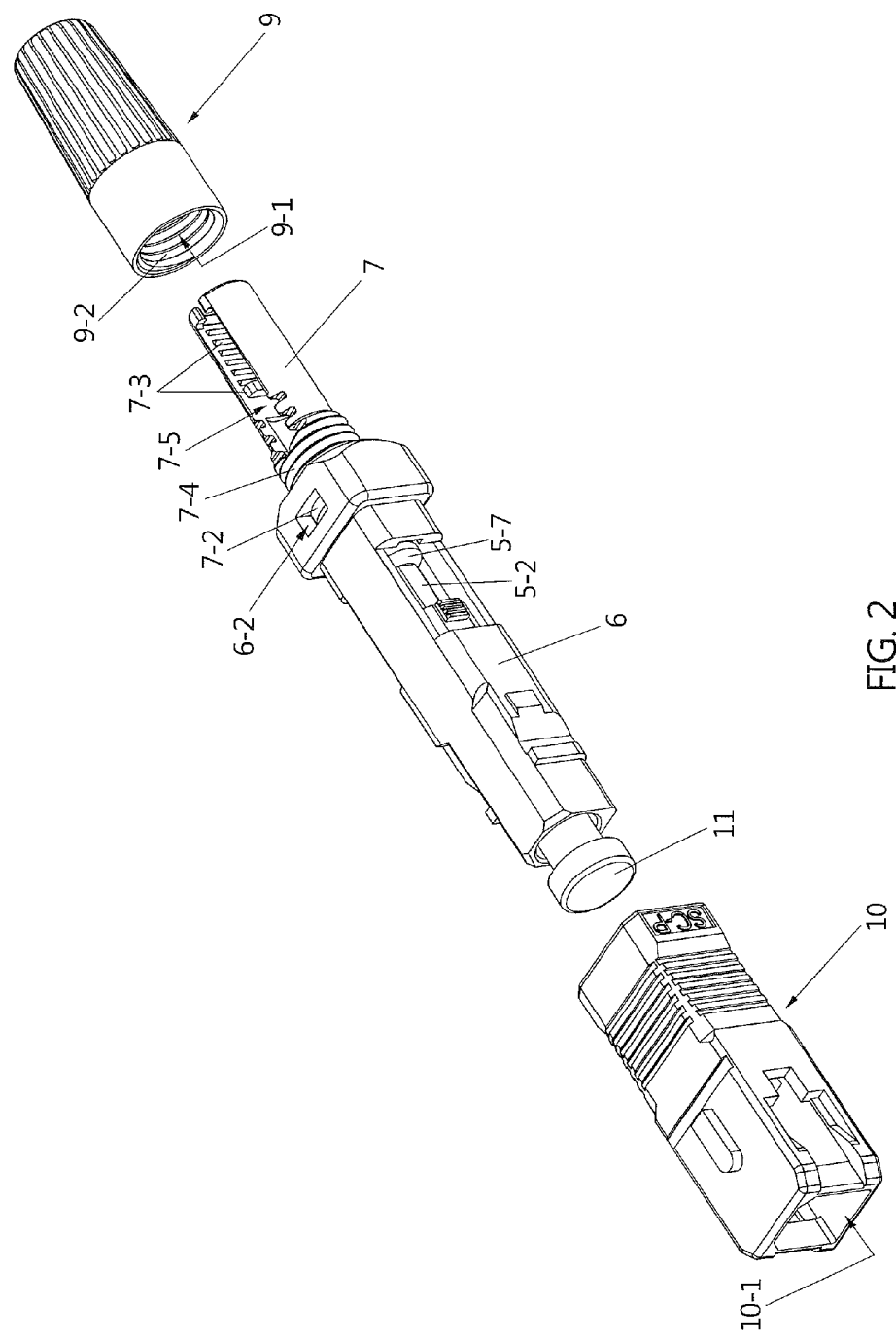
FIG. 2 and FIG. 3 are respectively an exploded view and a cross-sectional view of the optical fiber connector according to the preferred embodiment of the present invention.
Figure 3:
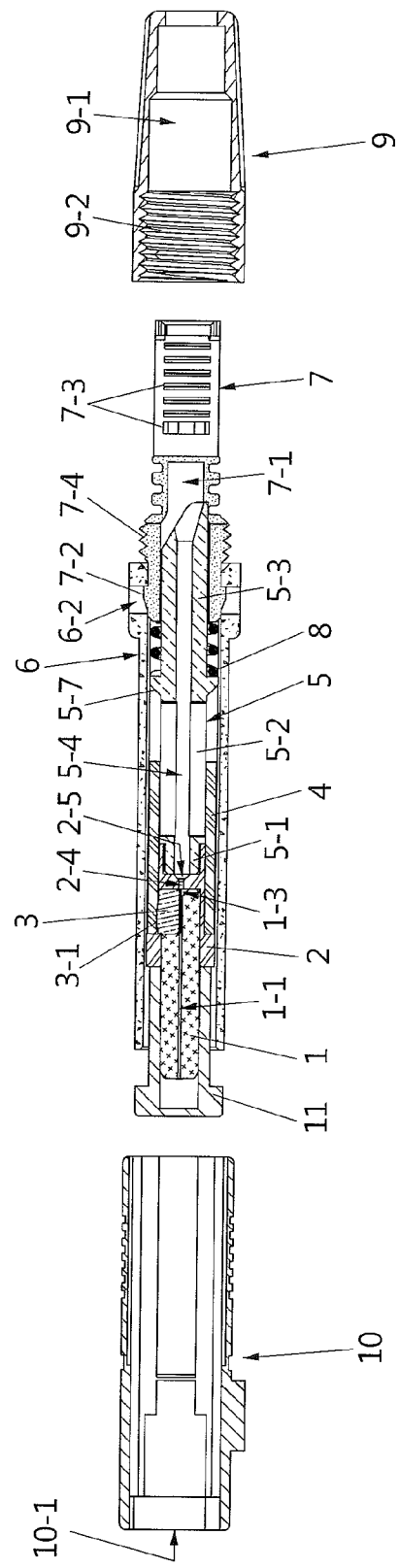
Figure 4:
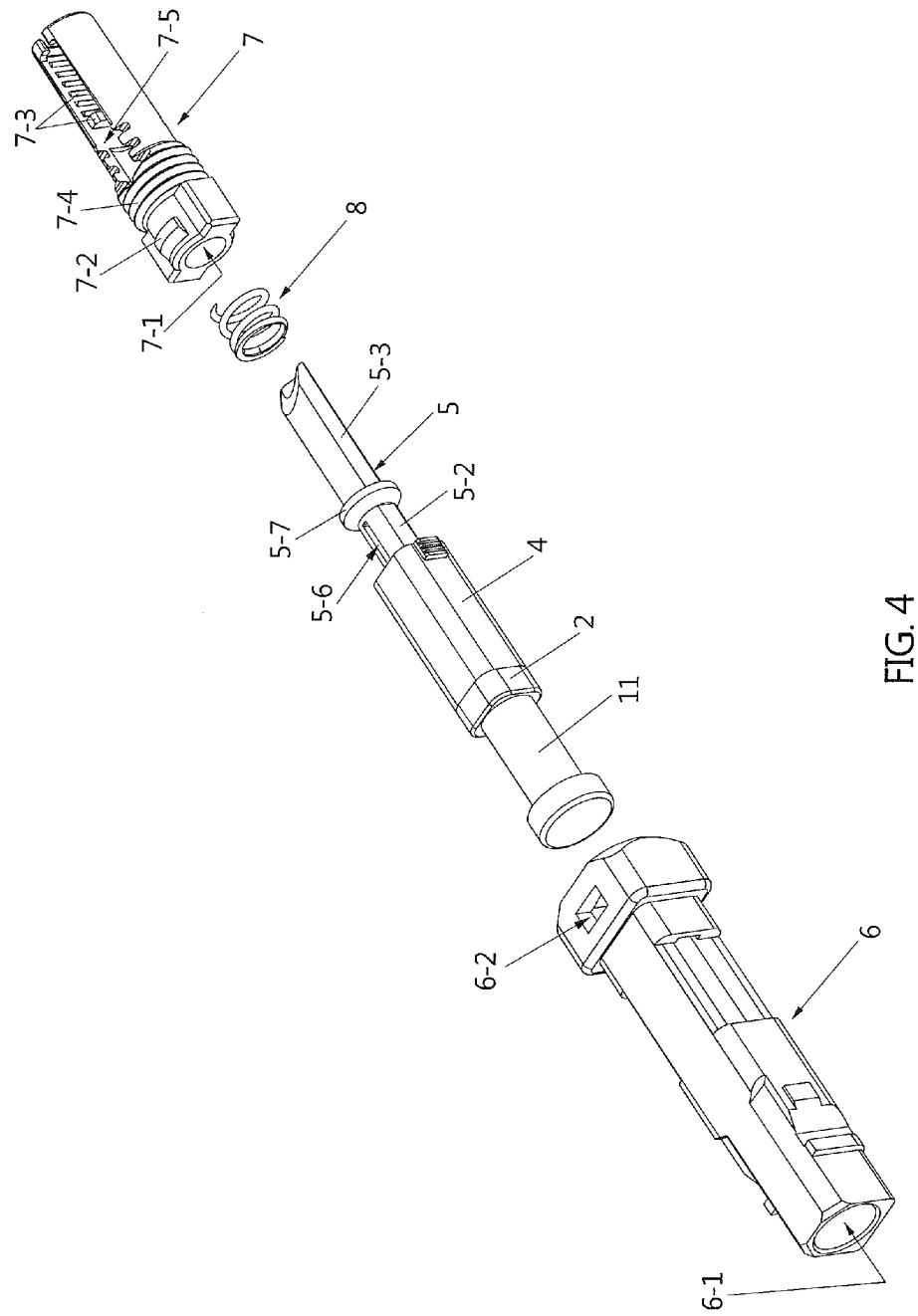
FIG. 4 and FIG. 5 are respectively an exploded view and a cross-sectional view of a connector main body of the optical fiber connector according to the preferred embodiment of the present invention.
Figure 5:
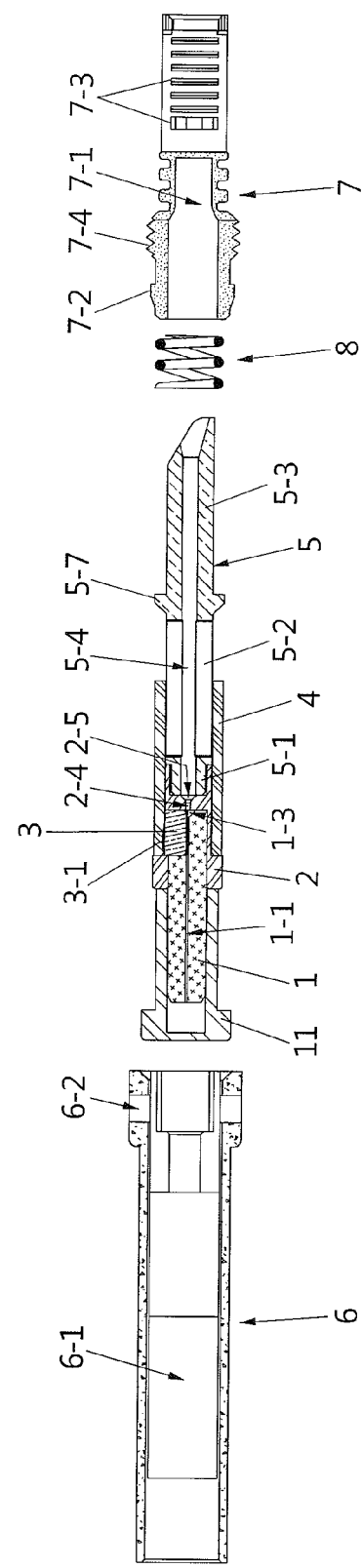
Figure 6:
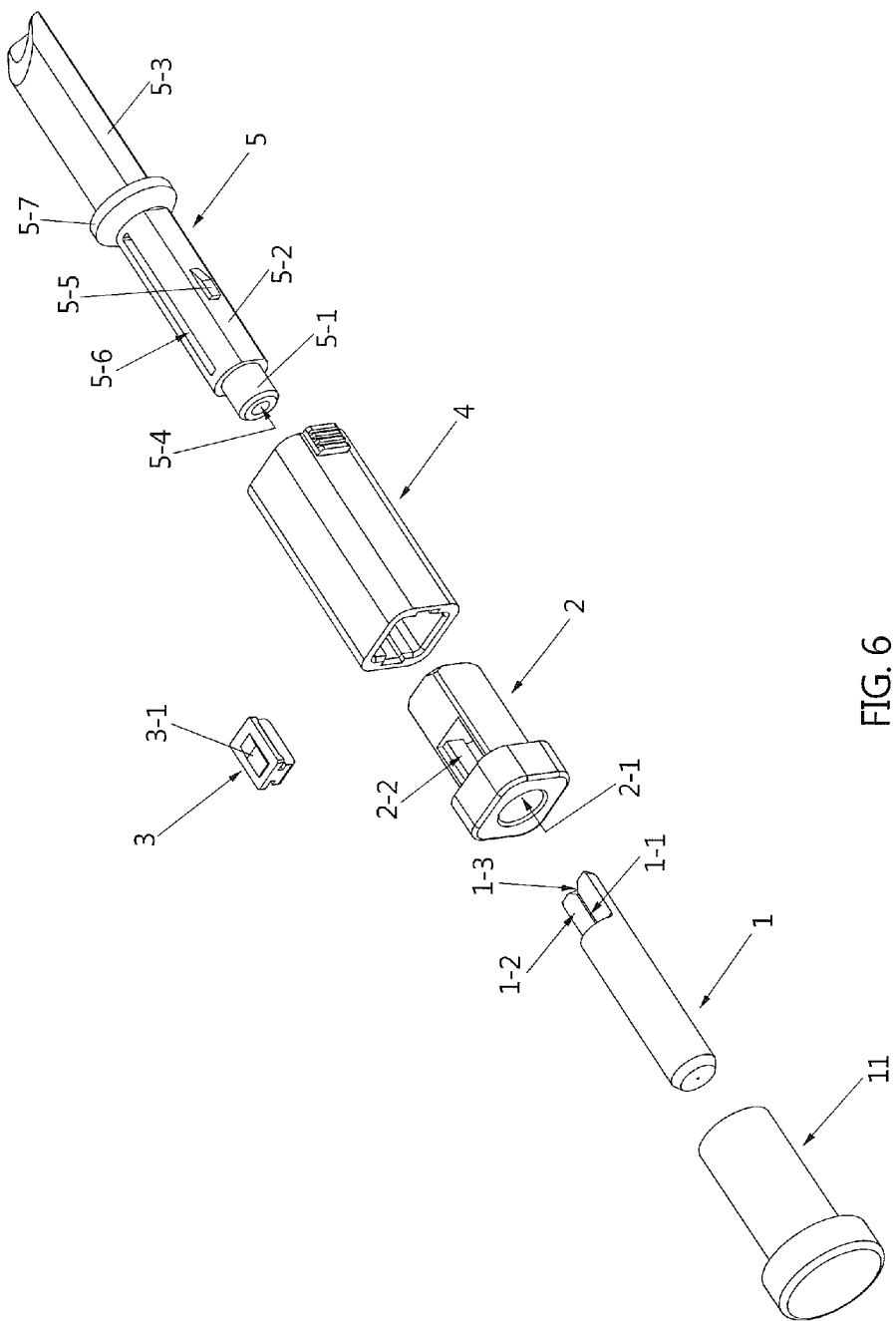
FIG. 6 and FIG. 7 are respectively an exploded view and a cross-sectional view of an optical fiber clamp component of the connector main body according to the preferred embodiment of the present invention.
Figure 7:
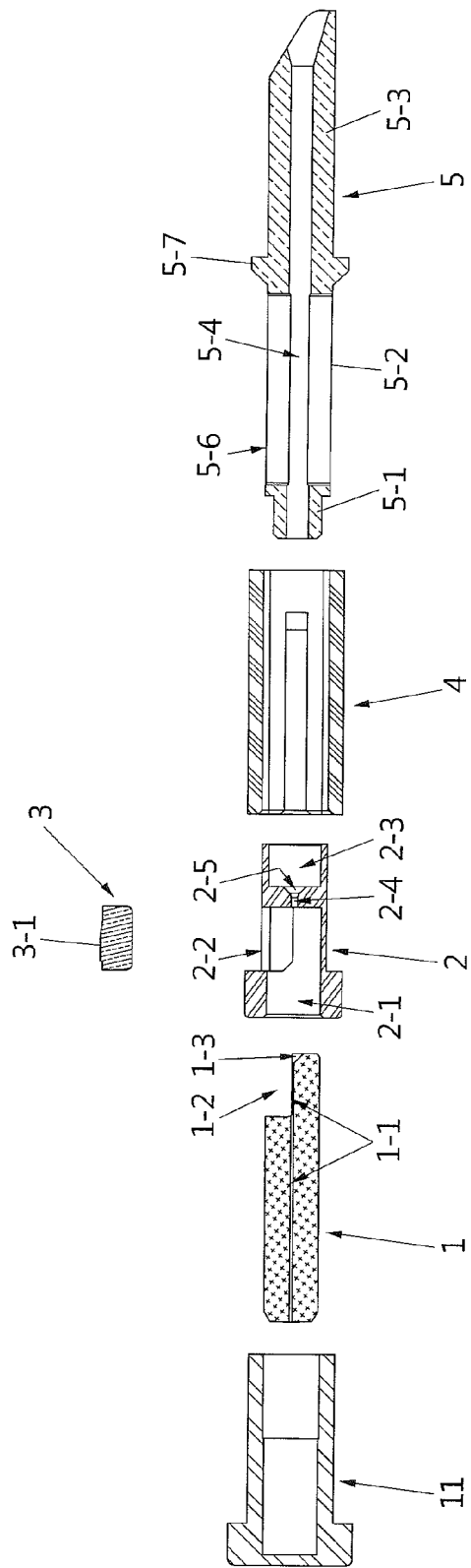
Figure 8:
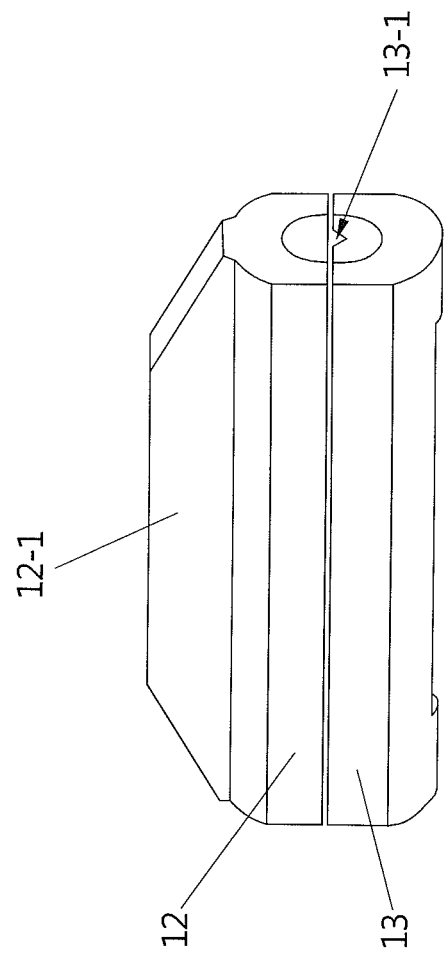
FIG. 8 is a diagram of a traditional optical fiber connector.
Figure 9:
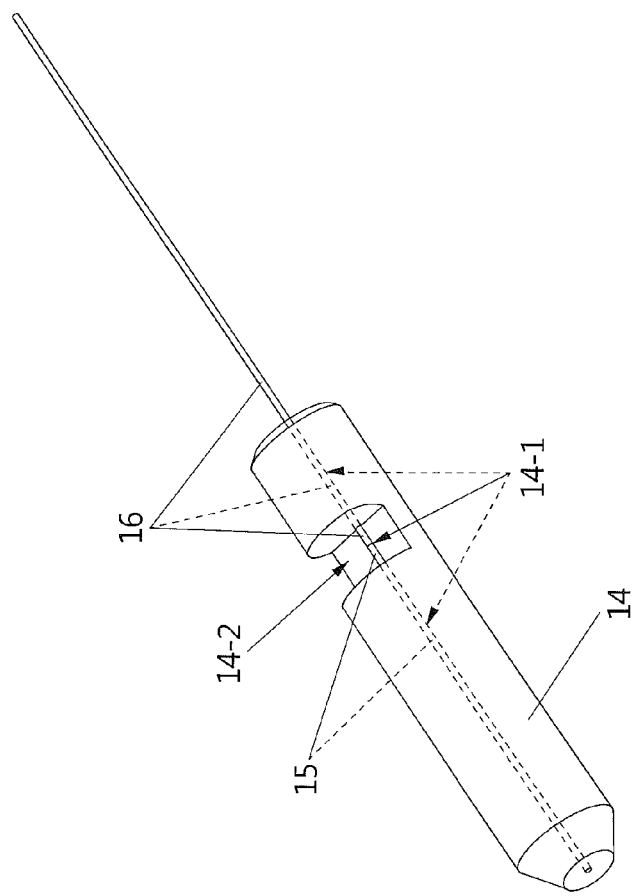
FIG. 9 is a diagram of another traditional optical fiber connector.

As shown in FIG. 1 to FIG. 7, an optical fiber connector of the embodiment is provided and is utilized for quickly joining optical fibers in the field. Therefore, the optical fiber connector is also known as an optical fiber quick connector or field installable/mountable optical fiber connector. In the embodiment, the optical fiber connector is, but is not limited to, a standard connector (SC). In another embodiment, the optical fiber connector can be a lucent/local connector (LC), a ferrule connector (FC), or an optical fiber connector of any other different type. As shown in FIG. 2 and FIG. 3, the optical fiber connector of the embodiment comprises a lock cap 9, a connector main body, and a housing 10. As shown in FIG. 4 and FIG. 5, the connector main body comprises a front sleeve 6, an optical fiber clamp component, a spring 8, and a rear tube 7. As shown in FIG. 6 and FIG. 7, the optical fiber clamp component of the embodiment comprises a dust-proof cap 11, a ferrule 1, a fastening tube 2, a cover plate 3, a compression sleeve 4, and a clamp tube 5.

Referring to FIG. 6 and FIG. 7 which illustrate an exploded view of the optical fiber clamp component, and further referring to FIG. 4 and FIG. 5 whose middle part illustrates an assembly view of the optical fiber clamp component, the optical fiber clamp component of the optical fiber connector of the embodiment comprises the ferrule 1, the fastening tube 2, and the cover plate 3. The ferrule 1 comprises a through hole 1-1 and a breach 1-2 disposed on a wall of the ferrule 1. A pre-embedded optical fiber (not shown in the figures) is pre-embedded in a front part of the through hole 1-1 of the ferrule 1. A field optical fiber (not shown in the figures) is inserted into a rear part of the through hole 1-1 of the ferrule 1 in the field. A joint of the pre-embedded optical fiber and the field optical fiber is located at the breach 1-2. A part of the through hole 1-1 of the ferrule 1 is exposed in the breach 1-2. A part of the ferrule 1 on which the breach 1-2 is disposed has a transversal cross-section having a substantial semicircle shape, and the other part of the ferrule 1 has a transversal cross-section having a circle shape. An end of the ferrule 1 utilized for inserting the field optical fiber further comprises a guide opening 1-3, which has a cone shape, which connects the through hole 1-1, and which is of benefit to insert the field optical fiber. The fastening tube 2 comprises a ferrule accommodating portion 2-1 and an opening 2-2. The ferrule accommodating portion 2-1 accommodates the part of the ferrule 1 on which the breach 1-2 is disposed. The opening 2-2 is disposed on a wall of the fastening tube 2, connects the ferrule accommodating portion 2-1, and is positionally corresponding to the breach 1-2. The cover plate 3 is configured to pass through the opening 2-2 of the fastening tube 2, to be coupled with the fastening tube 2, and to be disposed in the breach 1-2. The cover plate 3 provides pressure to press the joint of the pre-embedded optical fiber and the field optical fiber. Comparing to the prior V-shape trough, the structure of the ferrule 1 is easily machined. Therefore, the ferrule 1 can adopt a material which is hardly influenced by environment temperature, such as ceramic material, and, as a result, the ferrule 1 has high stability. The fastening tube 2 encloses the ferrule 1. The cover plate 3 passes through the opening 2-2 of the fastening tube 2, is disposed in the breach 1-2, and presses the joint of the pre-embedded optical fiber and the field optical fiber. Therefore, the joint of the two optical fibers is fixed, and, as a result, an amount of joint loss is stable.

The optical fiber clamp component of the optical fiber connector of the embodiment further comprises a compression sleeve 4. The cover plate 3 comprises a bump 3-1 disposed on an upper side thereof. The compression sleeve 4 encloses a part of the fastening tube 2 on which the opening 2-2 is disposed. An inner wall of the compression sleeve 4 presses the bump 3-1 of the cover plate 3 to make a lower side of the cover plate 3 tightly press the joint of the pre-embedded optical fiber and the field optical fiber.

The optical fiber clamp component of the optical fiber connector of the embodiment further comprises a clamp tube 5. The clamp tube 5 comprises a through hole 5-4 for being passed through by the field optical fiber. The clamp tube 5 further comprises a front segment 5-1, a middle segment 5-2, a rear segment 5-3, and two bumps 5-5 respectively disposed on two sides of the middle segment 5-2. The fastening tube 2 further comprises a tube accommodating portion 2-3 and a through hole 2-4. The tube accommodating portion 2-3 accommodates the front segment 5-1. The through hole 2-4 is located between the ferrule accommodating portion 2-1 and the tube accommodating portion 2-3, and is for being passed through by the field optical fiber. An end of the through hole 2-4 of the fastening tube 2 utilized for inserting the field optical fiber further comprises a guide opening 2-5, which has a cone shape, which connects the through hole 2-4, and which is of benefit to insert the field optical fiber. The inner wall of the compression sleeve 4 presses the bumps 5-5 of the middle segment 5-2 to shrink an inner diameter of the through hole 5-4 of the middle segment 5-2 to tightly clamp the field optical fiber passing through the through hole 5-4 of the clamp tube 5. In addition, the middle segment 5-2 comprises a trough 5-6 disposed on a wall thereof and connecting the through hole 5-4 of the clamp tube 5. The trough 5-6 can increase shrinkage of the inner diameter of the through hole 5-4 of the middle segment 5-2, so that the optical fibers in the through hole 5-4 can be clamped tighter. The inner wall of the compression sleeve 4 presses the bumps 5-5 of the middle segment 5-2 to shrink the trough 5-6 of the middle segment 5-2 to shrink the inner diameter of the through hole 5-4 of the middle segment 5-2 and tightly clamp the field optical fiber passing through the through hole 5-4 of the clamp tube 5.

The optical fiber clamp component of the optical fiber connector of the embodiment further comprises a dust-proof cap 11. The dust-proof cap 11 encloses a front part of the ferrule 1 to prevent dust from attaching to the pre-embedded optical fiber exposed in a front end of the through hole 1-1 of the ferrule 1 when the optical fiber connector is unused.

Referring to FIG. 4 and FIG. 5 which illustrate an exploded view of the connector main body, and further referring to FIG. 2 and FIG. 3 whose middle part illustrates an assembly view of the connector main body, the connector main body of the optical fiber connector of the embodiment further comprises the front sleeve 6, the optical fiber clamp component, the spring 8, and the rear tube 7. The clamp tube 5 further comprises a flange 5-7 disposed on a wall thereof and located between the middle segment 5-2 and the rear segment 5-3. The spring 8 encloses a front part of the rear segment 5-3 and abuts the flange 5-7. The front sleeve 6 comprises an accommodating through hole 6-1 and a coupling component 6-2. The accommodating through hole 6-1 of the front sleeve 6 accommodates a rear part of dust-proof cap 11, a rear part of the ferrule 1, the fastening tube 2, the cover plate 3, the compression sleeve 4, the front segment 5-1, the middle segment 5-2, the front part of the rear segment 5-3, and the spring 8. A front end of the rear tube 7 abuts the spring 8. The rear tube 7 comprises an accommodating through hole 7-1 and a coupling component 7-2. The accommodating through hole 7-1 of the rear tube 7 accommodates a rear part of the rear segment 5-3 and the field optical fiber. The coupling component 7-2 of the rear tube 7 and the coupling component 6-2 of the front sleeve 6 are coupled with each other. The spring 8 abuts the flange 5-7 of the clamp tube 5 and the front end of the rear tube 7, and the connector main body relative to the whole of the optical fiber connector has a properly elastic character along an axis direction. The spring 8 serves as an elastic buffer when the connector main body connects to another connector main body of an optical fiber connector. In addition, the rear tube 7 further comprises a plurality of ribs 7-3 disposed on an inner wall thereof. The ribs 7-3 tightly clamp the field optical fiber passing through the accommodating through hole 7-1 of the rear tube 7.

Referring to FIG. 2 and FIG. 3 which illustrate an exploded view of the optical fiber connector, and further referring to FIG. 1 which illustrates an assembly view of the optical fiber connector, the optical fiber connector of the embodiment further comprises the lock cap 9. The lock cap 9 comprises an accommodating through hole 9-1 and an inner thread 9-2 disposed on an inner wall of the lock cap 9. The rear tube 7 further comprises an outer thread 7-4 disposed on an outer wall thereof. When the lock cap 9 encloses the rear tube 7 by mating the inner thread 9-2 with the outer thread 7-4, the inner wall of the lock cap 9 presses the rear tube 7 to shrink an inner diameter of the accommodating through hole 7-1 of the rear tube 7 to tightly clamp the field optical fiber passing through the accommodating through hole 7-1 of the rear tube 7. In addition, the rear tube 7 further comprises a trough 7-5 disposed on a wall thereof. The trough 7-5 connects the accommodating through hole 7-1 of the rear tube 7. The trough 7-5 can increase shrinkage of the inner diameter of the accommodating through hole 7-1 of the rear tube 7, so that the optical fibers therein can be clamped tighter. The inner wall of the lock cap 9 presses the rear tube 7 to shrink the trough 7-5 of the rear tube 7 to shrink the inner diameter of the accommodating through hole 7-1 of the rear tube 7 and tightly clamp the field optical fiber passing through the accommodating through hole 7-1 of the rear tube 7.

The optical fiber connector of the embodiment further comprises the housing 10. The housing 10 comprises an opening 10-1 disposed on a front end thereof. The housing 10 encloses the front sleeve 6. A front part of the ferrule 1 and a front part of the dust-proof cap 11 enclosing the front part of the ferrule 1 extend outside the opening 10-1 of the housing 10.

As shown in FIG. 3, the field optical fiber shall pass through the accommodating through hole 7-1 of the rear tube 7, the through hole 5-4 of the clamp tube 5, and the guide opening 2-5 and the through hole 2-4 of the fastening tube 2, and then insert the rear part of the through hole 1-1 of the ferrule 1, to be joined to the pre-embedded optical fiber disposed in the front part of the through hole 1-1 at a predetermined joint position in the breach 1-2.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical fiber connector comprising:
   a ferrule comprising a through hole and a breach, with the breach disposed on a wall of the ferrule, with a pre-embedded optical fiber pre-embedded in a front part of the through hole of the ferrule, with a field optical fiber being inserted into a rear part of the through hole of the ferrule, with a joint of the pre-embedded optical fiber and the field optical fiber located at the breach, with a part of the through hole of the ferrule being exposed in the breach;
   a fastening tube comprising a ferrule accommodating portion and an opening, with the ferrule accommodating portion accommodating a part of the ferrule on which the breach is disposed, with the opening of the fastening tube being disposed on a wall of the fastening tube, connecting the ferrule accommodating portion, and being positionally corresponding to the breach;
   a cover plate passing through the opening and disposed in the breach, with the cover plate pressing the joint of the pre-embedded optical fiber and the field optical fiber; and
   a compression sleeve slideably received on the fastening tube for movement parallel to the through hole, with the cover plate comprising a bump disposed on an upper side thereof, wherein the compression sleeve encloses a part of the fastening tube on which the opening is disposed, and wherein an inner wall of the compression sleeve presses the bump of the cover plate to make a lower side of the cover plate tightly press the joint of the pre-embedded optical fiber and the field optical fiber.

2. The optical fiber connector of claim 1, further comprising a clamp tube, wherein the clamp tube comprises a through hole for being passed through by the field optical fiber, wherein the clamp tube further comprises a front segment, a middle segment, a rear segment, and two bumps respectively disposed on two sides of the middle segment, wherein the fastening tube further comprises a tube accommodating portion and a through hole, wherein the tube accommodating portion accommodates the front segment, wherein the through hole is located between the ferrule accommodating portion and the tube accommodating portion and is for being passes through by the field optical fiber, and wherein the inner wall of the compression sleeve presses the bumps of the middle segment to shrink an inner diameter of the through hole of the middle segment to tightly clamp the field optical fiber passing through the through hole of the clamp tube.

3. The optical fiber connector of claim 2, wherein the middle segment comprises a trough disposed on a wall thereof and connecting the through hole of the clamp tube, wherein the inner wall of the compression sleeve presses the two bumps of the middle segment to shrink the trough of the middle segment to shrink the inner diameter of the through hole of the middle segment and tightly clamp the field optical fiber passing through the through hole of the clamp tube.

4. The optical fiber connector of claim 2, further comprising a front sleeve, a rear tube, and a spring, with the clamp tube further comprising a flange disposed on a wall thereof and located between the middle segment and the rear segment, wherein the spring encloses a front part of the rear segment and abuts the flange, wherein the front sleeve comprises a coupling component and an accommodating through hole for accommodating a rear part of the ferrule, the fastening tube, the cover plate, the compression sleeve, the front segment, the middle segment, the front part of the rear segment, and the spring, wherein a front end of the rear tube abuts the spring, wherein the rear tube comprises a coupling component and an accommodating through hole for accommodating a rear part of the rear segment and the field optical fiber, and wherein the coupling component of the rear tube and the coupling component of the front sleeve are coupled with each other.

5. The optical fiber connector of claim 4, wherein the rear tube further comprises a plurality of ribs disposed on an inner wall thereof, and wherein the plurality of ribs tightly clamp the field optical fiber passing through the accommodating through hole of the rear tube.

6. The optical fiber connector of claim 4, further comprising a lock cap, wherein the lock cap comprises an accommodating through hole and an inner thread disposed on an inner wall of the lock cap, wherein the rear tube further comprises an outer thread disposed on an outer wall thereof, wherein the lock cap encloses the rear tube by mating the inner thread with the outer thread, and wherein the inner wall of the lock cap presses the rear tube to shrink an inner diameter of the accommodating through hole of the rear tube to tightly clamp the field optical fiber passing through the accommodating through hole of the rear tube.

7. The optical fiber connector of claim 6, wherein the rear tube further comprises a trough disposed on a wall thereof and connecting the accommodating through hole thereof, wherein the inner wall of the lock cap presses the rear tube to shrink the trough of the rear tube to shrink the inner diameter of the accommodating through hole of the rear tube and tightly clamp the field optical fiber passing through the accommodating through hole of the rear tube.

8. The optical fiber connector of claim 6, further comprising a housing, wherein the housing comprises an opening disposed on a front end thereof, wherein the housing encloses the front sleeve, and wherein a front part of the ferrule extends outside the opening of the housing.

9. The optical fiber connector of claim 1, further comprising a dust-proof cap, wherein the dust-proof cap encloses a front part of the ferrule.

\* \* \* \* \*